United States Patent
Lee et al.

(10) Patent No.: US 10,020,565 B2
(45) Date of Patent: Jul. 10, 2018

(54) BAND-TYPE ELECTRONIC DEVICE AND ANTENNA MODULE INCLUDED THEREIN

(71) Applicant: CENTER FOR INTEGRATED SMART SENSORS FOUNDATION, Daejeon (KR)

(72) Inventors: Kyung Hak Lee, Gyeonggi-do (KR); Min Seok Han, Gyeonggi-do (KR); Young Ki Kim, Daejeon (KR)

(73) Assignee: CENTER FOR INTEGRATED SMART SENSORS FOUNDATION, Daejeon (KR)

( * ) Notice: Subject to any disclaimer, the term of this patent is extended or adjusted under 35 U.S.C. 154(b) by 317 days.

(21) Appl. No.: 14/876,463

(22) Filed: Oct. 6, 2015

(65) Prior Publication Data

US 2017/0054201 A1    Feb. 23, 2017

(30) Foreign Application Priority Data

Aug. 20, 2015   (KR) ................. 10-2015-0117538

(51) Int. Cl.
*H01Q 1/44* (2006.01)
*H01Q 1/27* (2006.01)
*H01Q 7/00* (2006.01)
*H01F 38/14* (2006.01)
*H04B 5/00* (2006.01)
*H02J 50/12* (2016.01)
(Continued)

(52) U.S. Cl.
CPC ............ *H01Q 1/273* (2013.01); *H01F 38/14* (2013.01); *H01Q 7/00* (2013.01); *H02J 50/12* (2016.02); *H04B 5/0031* (2013.01); *H04B 5/0037* (2013.01); *H04B 5/0081* (2013.01); *H04B 5/0093* (2013.01); *H04W 4/80* (2018.02); *H02J 7/025* (2013.01)

(58) Field of Classification Search
CPC ....................................... H01Q 1/273
USPC ........................................... 320/108
See application file for complete search history.

(56) References Cited

U.S. PATENT DOCUMENTS 7,215,600 B1 *   5/2007   DeRosa ............ G04G 21/04
                                                343/718
7,949,396 B2 *   5/2011   Mi ................ A61B 5/0028
                                                607/36
(Continued)

FOREIGN PATENT DOCUMENTS

KR    10-2010-0050028 A    5/2010
KR    10-2014-0128469 A    11/2014

OTHER PUBLICATIONS

Office Action for Korean Patent Application No. 10-2015-0117538, dated May 30, 2016.
(Continued)

*Primary Examiner* — Drew A Dunn
*Assistant Examiner* — Jerry D Robbins
(74) *Attorney, Agent, or Firm* — Marshall, Gerstein & Borun LLP

(57) ABSTRACT

A band-type electronic device and an antenna module included therein are provided. The band-type electronic device includes a band configured to be worn on a body of a user, a metal housing configured to connect to the band, and a frequency control module configured to operate such that the metal housing is used as a wireless charging antenna.

8 Claims, 6 Drawing Sheets

(51) Int. Cl.
*H04W 4/80* (2018.01)
*H02J 7/02* (2016.01)

(56) References Cited

U.S. PATENT DOCUMENTS

| | | | |
|---|---|---|---|
| 8,570,838 B2* | 10/2013 | Fujisawa | G04C 10/02 343/718 |
| 2005/0219955 A1* | 10/2005 | Xu | G04G 21/04 368/88 |
| 2010/0112964 A1 | 5/2010 | Yi et al. | |
| 2012/0242161 A1 | 9/2012 | Kudo et al. | |
| 2013/0141037 A1 | 6/2013 | Jenwatanavet et al. | |
| 2014/0103869 A1 | 4/2014 | Radovic et al. | |
| 2015/0077047 A1 | 3/2015 | Chen | |
| 2016/0006290 A1* | 1/2016 | Ho | H02J 7/0044 320/108 |
| 2016/0241306 A1* | 8/2016 | Moon | H01Q 1/2208 |
| 2016/0380342 A1* | 12/2016 | Kenoun | H01Q 1/273 343/718 |

OTHER PUBLICATIONS

Search Report for European Application No. 15185480.9, dated Jan. 27, 2016.

* cited by examiner

BAND-TYPE ELECTRONIC DEVICE AND ANTENNA MODULE INCLUDED THEREIN

CROSS-REFERENCE TO RELATED APPLICATIONS

A claim for priority under 35 U.S.C. § 119 is made to Korean Patent Application No. 10-2015-0117538 filed Aug. 20, 2015, in the Korean Intellectual Property Office, the entire contents of which are hereby incorporated by reference.

BACKGROUND

Embodiments of the inventive concepts described herein relate to band-type electronic devices which are worn on bodies of users, and more particularly, to technologies of using metal housings, included in band-type electronic devices, as antennas.

Band-type electronic devices perform voice and video communication functions, functions of inputting/outputting information, functions of storing data, and the like, using wireless communication, while being worn on bodies of users.

A charging way of these band-type electronic devices has been developed from a way of charging a power source using a separate charging terminal to a way of charging a power source using a separate wireless charging antenna.

A conventional band-type electronic device having a conventional charging way using a separate wireless charging antenna increases user convenience since charging a power source wirelessly without connecting to a charging cable, and increase a size of its housing since including the separate wireless charging antenna in the housing.

Also, the conventional band-type electronic device having the conventional charging way using the separate wireless charging antenna leads to deterioration in wireless performance due to its housing of metal materials when the housing is formed of the metal materials.

Therefore, there is a need for a band-type electronic device which uses a wireless charging way of increasing user convenience, minimizes a size of its housing, and improves wireless performance and an antenna module included in the band-type electronic device.

SUMMARY

Embodiments of the inventive concepts provide a band-type electronic device which uses a wireless charging way of increasing user convenience, minimizes a size of its housing, and improves wireless performance by using its metal housing as a wireless charging antenna and an antenna module included therein.

Embodiments of the inventive concepts provide a band-type electronic device which uses a common antenna in a wireless charging process and a wireless communication process by using its metal housing as a wireless charging antenna or a wireless communication antenna and an antenna module included therein.

One aspect of embodiments of the inventive concept is directed to provide a band-type electronic device. The band-type electronic device may include a band configured to be worn on a body of a user, a metal housing configured to connect to the band, and a frequency control module configured to operate such that the metal housing is used as a wireless charging antenna.

The frequency control module may include a wireless charging impedance matching unit configured to perform impedance matching such that the metal housing resonates in a wireless charging frequency band and a power feeder configured to connect with the wireless charging impedance matching unit.

The frequency control module may further include a direct current (DC) block capacitor configured to connect with the wireless charging impedance matching unit and the metal housing and to remove DC components from outputs of the wireless charging impedance matching unit and the metal housing.

The frequency control module may transmit power received through the metal housing used as the wireless charging antenna to a battery module included in the band-type electronic device.

Another aspect of embodiments of the inventive concept is directed to provide an antenna module included in a band-type electronic device. The antenna module may include a metal housing configured to be included in the band-type electronic device and a frequency control module configured to operate such that the metal housing is used as a wireless charging antenna. The frequency control module may include a wireless charging impedance matching unit configured to perform impedance matching such that the metal housing resonates in a wireless charging frequency band and a power feeder configured to connect with the wireless charging impedance matching unit.

Another aspect of embodiments of the inventive concept is directed to provide a band-type electronic device. The band-type electronic device may include a band configured to be worn on a body of a user, a metal housing configured to connect to the band, and a frequency control module configured to operate such that the metal housing is used as a wireless charging antenna or a wireless communication antenna.

The frequency control module may include a wireless charging impedance matching unit configured to perform impedance matching such that the metal housing resonates in a wireless charging frequency band, a wireless communication impedance matching unit configured to perform impedance matching such that the metal housing resonates in a wireless communication frequency band, a first switching unit configured to selectively drive one of the wireless charging impedance matching unit and the wireless communication impedance matching unit, and a power feeder configured to connect with one of the wireless charging impedance matching unit and the wireless communication impedance matching unit according to an operation of the first switching unit.

The metal housing may be used as one of the wireless charging antenna and the wireless communication antenna as one of the wireless charging impedance matching unit and the wireless communication impedance matching unit is selectively driven according to an operation of the first switching unit.

The wireless communication frequency band may include at least one of a near field communication (NFC) frequency band, a Bluetooth (BT) frequency band, a radio frequency identification (RFID) frequency band, an infrared data association (IrDA) communication frequency band, an ultra wideband (UWB) frequency band, a wireless local area network (WLAN) frequency band, a wireless broadband (Wibro) frequency band, a world interoperability for microwave access (Wimax) frequency band, or a high speed downlink packet access (HSDPA) frequency band.

The wireless charging frequency band may include at least a part of the remaining bands except for the wireless communication frequency band.

The frequency control module may further include a direct current (DC) block capacitor configured to connect with at least one of the wireless charging impedance matching unit or the wireless communication impedance matching unit and the metal housing and to remove DC components from outputs of the at least one of the wireless charging impedance matching unit or the wireless communication impedance matching unit and the metal housing.

The frequency control module may further include a second switching unit configured to selectively connect, when the DC block capacitor includes one DC block capacitor, the one DC block capacitor with one of the wireless charging impedance matching unit and the wireless communication impedance matching unit.

The frequency control module may further include when the DC block capacitor includes two DC block capacitors, a third switching unit configured to selectively connect the metal housing with one of the two DC block capacitors.

The frequency control module may transmit power received through the metal housing used as the wireless charging antenna to a battery module included in the band-type electronic device.

Another aspect of embodiments of the inventive concept is directed to provide an antenna module included in a band-type electronic device. The antenna module may include a metal housing configured to be included in the band-type electronic device and a frequency control module configured to operate such that the metal housing is used as a wireless charging antenna or a wireless communication antenna. The frequency control module may include a wireless charging impedance matching unit configured to perform impedance matching such that the metal housing resonates in a wireless charging frequency band, a wireless communication impedance matching unit configured to perform impedance matching such that the metal housing resonates in a wireless communication frequency band, a first switching unit configured to selectively drive one of the wireless charging impedance matching unit and the wireless communication impedance matching unit, and a power feeder configured to connect with one of the wireless charging impedance matching unit and the wireless communication impedance matching unit according to an operation of the first switching unit.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
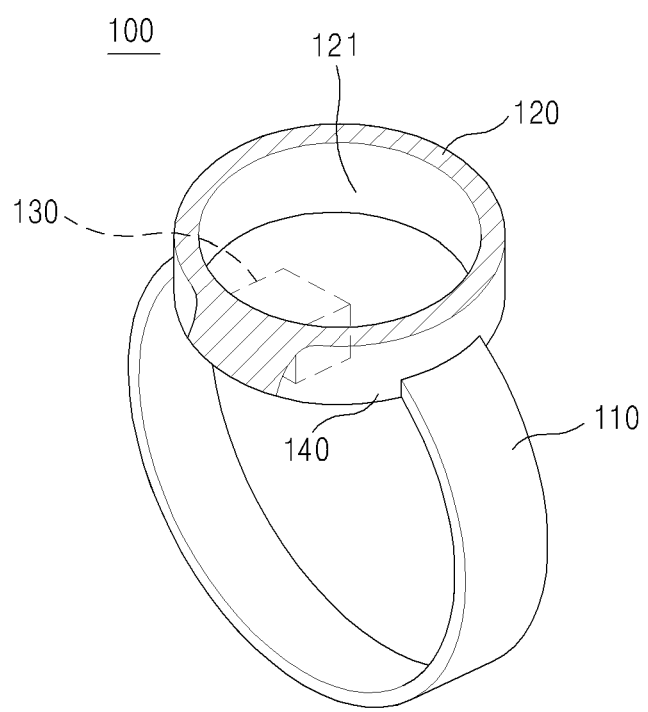
FIG. 1 is a drawing illustrating a structure of a band-type electronic device according to an exemplary embodiment of the inventive concept.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Hereinafter, a description will be given in detail for exemplary embodiments of the inventive concept with reference to the accompanying drawings. However, the inventive concept is not limited to exemplary embodiments described below or depicted in the drawings. Also, the same reference numerals shown in each of drawings represents the same members, respectively.

Also, terminologies used herein are used to appropriately describe exemplary embodiments of the inventive concept and thus may be changed depending on a user, the intention of an operator, or a custom of a field to which the inventive concept pertains, and the like. Therefore, the terminologies should be defined based on the following overall description of this specification.

FIG. 1 is a drawing illustrating a structure of a band-type electronic device according to an exemplary embodiment of the inventive concept.

Referring to FIG. 1, a band-type electronic device 100 according to an exemplary embodiment of the inventive concept may include a band 110 worn on a body of a user, a metal housing 120 connected to the band 110, and a frequency control module 130.

The metal housing 120 may be formed of a conductive metal to show a display 121, which displays time information, to the user through its upper surface, while being combined with a cover 140 and connecting to the band 110. However, the scope and sprit of the inventive concept may not be limited thereto. For example, the metal housing 120 may be a case in the band-type electronic device 100 and may be expanded to the cover 140.

The frequency control module 130 may electrically connect with the metal housing 120 while being included in the metal housing 120, and may operate such that the metal housing 120 resonates in a specific band and is used as a wireless charging antenna and/or a wireless communication antenna.

Also, although not illustrated, the frequency control module 130 included in the metal housing 120 may be included in an integral circuit board. In this case, a wireless communication module, an audio/video (A/V) input module, a user input sensing module, an interface module, a speaker module, an A/V output module, a control module, a memory module, or a battery module, and the like may be included in the integral circuit board. The wireless communication module (e.g., including a near field communication (NFC) module, a Bluetooth (BT) module, an infrared data association (IrDA) communication module, an ultra wideband (UWB) module, a wireless local area network (WLAN) module, a wireless broadband (Wibro) module, a world interoperability for microwave access (Wimax) module, or a high speed downlink packet access (HSDPA) module, and the like) may connect with the frequency control module 130 and may perform wireless communication function. The A/V input module (e.g., including a camera and a microphone) may receive an audio signal and a video signal. The user input sensing module may connect with the display 121 and may sense a touch input or a button input from the user. The interface module (e.g., including a wired/wireless headset port, a wired/wireless data port, a memory card port, a port which connects a device included in an identification module, an audio input/output (I/O) port, a video I/O port, and an earphone port) may perform an interface function with an external device. The speaker module may output an audio signal. The A/V output module may connect with the display 121 and the speaker module and may output an audio signal or a video signal. The control module may control an overall operation of the band-type electronic device 100. The memory module may store programs for processing and controlling the control module and may store I/O data. The battery module may supply power necessary for operations of respective elements under control of the control module.

Therefore, the frequency control module 130 may transmit power received through the metal housing 120 to the battery module included in the integral circuit board to charge the battery module by operating such that the metal housing 120 is used as a wireless charging antenna.

Also, the frequency control module 130 may perform a communication function in the band-type electronic device 100 by connecting with the wireless communication module included in the integral circuit board and operating such that the metal housing 120 is used as a wireless communication antenna.

A description will be given of operations when the metal housing 120 is used as the wireless charging antenna with reference to FIGS. 2 and 5. A description will be given of operations when the metal housing 120 is used as the wireless charging antenna or the wireless communication antenna with reference to FIGS. 3, 4, and 6. The metal housing 120, which operates as an antenna, and the frequency control module 130 will be described as one antenna module.

Also, various sensors are included inside or outside the metal housing 120. For example, an acceleration sensor, a gyro sensor, a temperature/humidity sensor, or a heart rate sensor, and the like may be included inside or outside the metal housing 120. Therefore, the band-type electronic device 100 may perform various functions using the various sensors.

Figure 2:
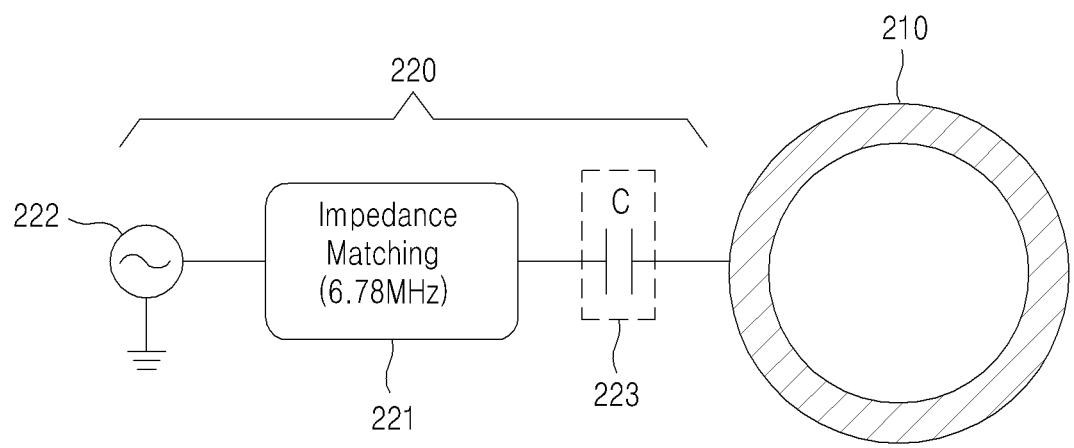
FIG. 2 is a circuit diagram illustrating an antenna module of using a metal housing as a wireless charging antenna according to an exemplary embodiment of the inventive concept.

FIG. 2 is a circuit diagram illustrating an antenna module of using a metal housing as a wireless charging antenna according to an exemplary embodiment of the inventive concept.

Referring to FIG. 2, an antenna module according to an exemplary embodiment of the inventive concept may include a metal housing 210 and a frequency control module 220 which operates such that the metal housing 210 is used as a wireless charging antenna. Herein, the frequency control module 220 may include a wireless charging impedance matching unit 221, a power feeder 222, and a direct current (DC) block capacitor 223.

The wireless charging impedance matching unit 221 may perform impedance matching such that the metal housing 210 resonates in a wireless charging frequency band. For example, the wireless charging impedance matching unit 221 may perform impedance matching and may change a frequency of the metal housing 210 to at least a part (e.g., a band which is identical to a transmit frequency band of a wireless charging transmitter which transmits a wireless charging signal) of the remaining bands except for a wireless communication frequency band. Specifically, the wireless charging impedance matching unit 221 may perform impedance matching such that the metal housing 210 resonates in the remaining bands (e.g., a band which is identical to a transmit frequency band of a wireless charging transmitter) except for a wireless communication frequency band used by a band-type electronic device among an NFC frequency band, a BT frequency band, a radio frequency identification (RFID) frequency band, an IrDA communication frequency band, a UWB frequency band, a WLAN frequency band, a Wibro frequency band, a Wimax frequency band, or an HSDPA frequency band.

FIG. 2 illustrates an example in which the wireless charging impedance matching unit 221 performs impedance matching such that the metal housing 210 resonates at a frequency of 6.78 MHz. The scope and spirit of the inventive concept may not be limited thereto. For example, the wireless charging impedance matching unit 221 may perform impedance matching such that the metal housing 210 resonates at frequencies of various wireless charging bands.

The power feeder 222 may connect with the wireless charging impedance matching unit 221 and may provide its output to the metal housing 210 and the wireless charging impedance matching unit 221. In this case, the power feeder 222 may include a signal power feeder and a ground power feeder.

The DC block capacitor 223 may connects with the wireless charging impedance matching unit 221 and the metal housing 210 and may remove DC components from outputs of the wireless charging impedance matching unit 221 and the metal housing 210.

As such, the wireless charging impedance matching unit 221 may operate such that the metal housing 210 is used as the wireless charging antenna. Therefore, the frequency control module 220 may supply power received from a wireless charging transmitter (not shown) through the metal housing 210 to a battery module (not shown) included in a band-type electronic device to support a wireless charging function.

Therefore, the frequency control module 220 according to an exemplary embodiment of the inventive concept may use a wireless charging way of increasing user convenience, may minimize a size of a portion except for a band in the band-type electronic device, and may improve wireless performance by using the metal housing 210 as the wireless charging antenna.

Figure 3:
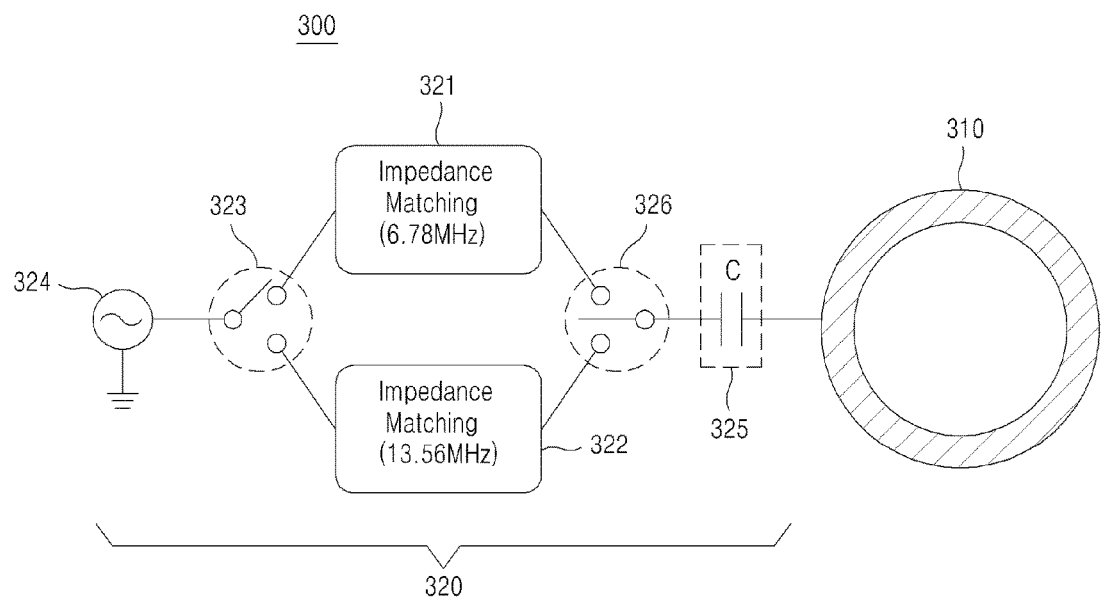
FIG. 3 is a circuit diagram illustrating an antenna module of using a metal housing as a wireless charging antenna or a wireless communication antenna according to an exemplary embodiment of the inventive concept.

FIG. 3 is a circuit diagram illustrating an antenna module of using a metal housing as a wireless charging antenna or a wireless communication antenna according to an exemplary embodiment of the inventive concept.

Referring to FIG. 3, an antenna module 300 according to an exemplary embodiment of the inventive concept may include a metal housing 310 and a frequency control module 320 which operates such that the metal housing 310 is used as a wireless charging antenna or a wireless communication antenna. Herein, the frequency control module 320 may include a wireless charging impedance matching unit 321, a wireless communication impedance matching unit 322, a first switching unit 323, a power feeder 324, a DC block capacitor 325, and a second switching unit 326.

The wireless charging impedance matching unit 321 may perform impedance matching such that the metal housing 310 resonates in a wireless charging frequency band. For example, the wireless charging impedance matching unit 321 may perform impedance matching and may change a frequency of the metal housing 310 to at least a part (e.g., a band which is identical to a transmit frequency band of a wireless charging transmitter which transmits a wireless charging signal) of the remaining bands except for a wireless communication frequency band. Specifically, the wireless charging impedance matching unit 321 may perform impedance matching such that the metal housing 310 resonates in the remaining bands (e.g., a band which is identical to a transmit frequency band of a wireless charging transmitter) except for a wireless communication frequency band used by a band-type electronic device among an NFC frequency band, a BT frequency band, an RFID frequency band, an IrDA communication frequency band, a UWB frequency band, a WLAN frequency band, a Wibro frequency band, a Wimax frequency band, or an HSDPA frequency band.

FIG. 3 illustrates an example in which the wireless charging impedance matching unit 321 performs impedance matching such that the metal housing 310 resonates at a frequency of 6.78 MHz. The scope and spirit of the inventive concept may not be limited thereto. For example, the wireless charging impedance matching unit 321 may perform impedance matching such that the metal housing 310 resonates at frequencies of various wireless charging bands.

The wireless communication impedance matching unit 322 may perform impedance matching such that the metal housing 310 resonates in a wireless communication frequency band. For one example, the wireless communication impedance matching unit 322 may perform impedance matching and may change a frequency of the metal housing 310 to one of an NFC frequency band, a BT frequency band, an RFID frequency band, an IrDA communication frequency band, a UWB frequency band, a WLAN frequency band, a Wibro frequency band, a Wimax frequency band, and an HSDPA frequency band. For another example, the wireless communication impedance matching unit 322 may perform impedance matching such that the metal housing 310 resonates in the wireless communication frequency band which is a different band distinguished from the wireless charging frequency band used by the wireless charging impedance matching unit 321.

FIG. 3 illustrates an example in which the wireless communication impedance matching unit 322 performs impedance matching such that the metal housing 310 resonates at a frequency of 13.56 MHz. The scope and spirit of the inventive concept may not be limited thereto. For example, the wireless communication impedance matching unit 322 may perform impedance matching such that the metal housing 310 resonates at frequencies of various wireless charging bands.

The first switching unit 323 may selectively drive one of the wireless charging impedance matching unit 321 and the wireless communication impedance matching unit 322.

The power feeder 324 may selectively connect with one of the wireless charging impedance matching unit 321 and the wireless communication impedance matching unit 322 according to an operation of the first switching unit 323 and may provide its output to the metal housing 310 and one of the wireless charging impedance matching unit 321 and the wireless communication impedance matching unit 322. In this case, the power feeder 324 may include a signal power feeder and a ground power feeder.

The DC block capacitor 325 may connects with at least one of the wireless charging impedance matching unit 321 or the wireless communication impedance matching unit 322 and the metal housing 310 and may remove DC components from outputs of the at least one of the wireless charging impedance matching unit 321 or the wireless communication impedance matching unit 322 and the metal housing 310.

The second switching unit 326 may selectively connect the DC block capacitor 325 with one of the wireless charging impedance matching unit 321 and the wireless communication impedance matching unit 322.

Therefore, when the first switching unit 323 connects the power feeder 324 with the wireless charging impedance matching unit 321 and when the second switching unit 326 connects the DC block capacitor 325 with the wireless charging impedance matching unit 321, as described above, the wireless charging impedance matching unit 321 may use the metal housing 310 as a wireless charging antenna.

In contrast, when the first switching unit 323 connects the power feeder 324 with the wireless communication impedance matching unit 322 and when the second switching unit 326 connects the DC block capacitor 325 with the wireless communication impedance matching unit 322, as described above, the wireless communication impedance matching unit 322 may use the metal housing 310 as a wireless communication antenna.

As such, the frequency control module 320 may selectively use the metal housing 310 as one of the wireless charging antenna and the wireless communication antenna by changing a frequency band in which the metal housing 310 resonates.

Therefore, the frequency control module 320 according to an exemplary embodiment of the inventive concept may use a wireless charging way of increasing user convenience, may minimize a size of a portion except for a band in the band-type electronic device, and may improve wireless performance by using the metal housing 310 as the wireless charging antenna or the wireless communication antenna.

Figure 4:
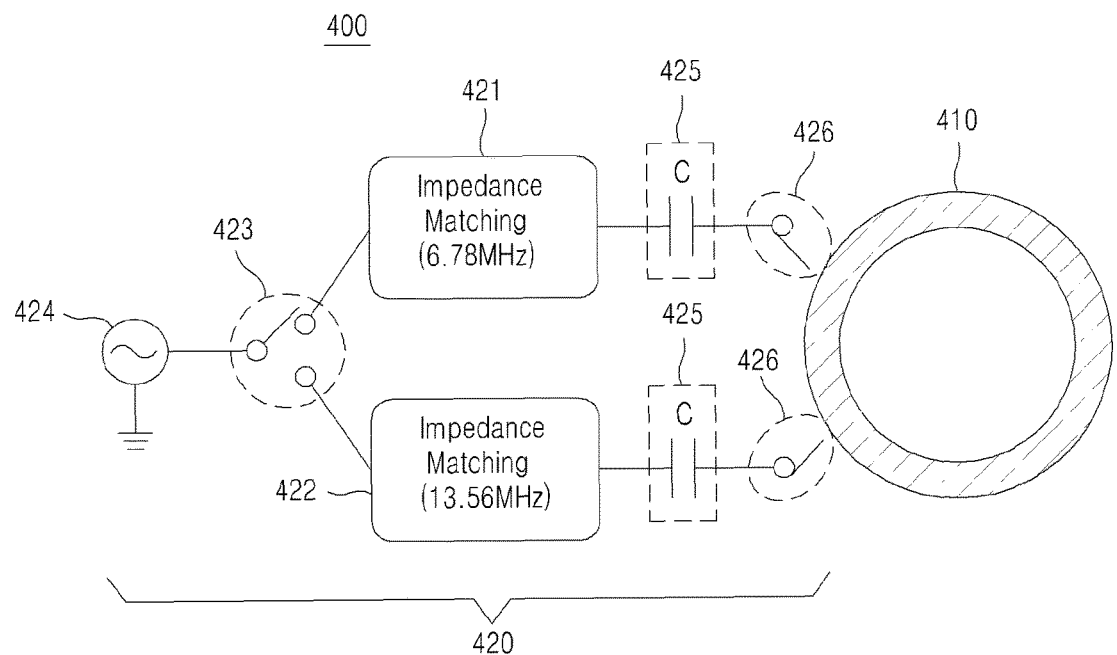
FIG. 4 is a circuit diagram illustrating an antenna module of using a metal housing as a wireless charging antenna or a wireless communication antenna according to another exemplary embodiment of the inventive concept.

FIG. 4 is a circuit diagram illustrating an antenna module of using a metal housing as a wireless charging antenna or a wireless communication antenna according to another exemplary embodiment of the inventive concept.

Referring to FIG. 4, an antenna module 400 according to another exemplary embodiment of the inventive concept may include a metal housing 410 and a frequency control module 420 which operates such that the metal housing 410 is used as a wireless charging antenna or a wireless communication antenna. Herein, the frequency control module 420 may include a wireless charging impedance matching unit 421, a wireless communication impedance matching unit 422, a first switching unit 423, a power feeder 424, two DC block capacitors 425, and two second switching unit 426.

The wireless charging impedance matching unit 421 may perform impedance matching such that the metal housing 410 resonates in a wireless charging frequency band. For example, the wireless charging impedance matching unit 421 may perform impedance matching and may change a frequency of the metal housing 410 to at least a part (e.g., a band which is identical to a transmit frequency band of a wireless charging transmitter which transmits a wireless charging signal) of the remaining bands except for a wireless communication frequency band. Specifically, the wireless charging impedance matching unit 421 may perform impedance matching such that the metal housing 410 resonates in the remaining bands (e.g., a band which is identical to a transmit frequency band of a wireless charging transmitter) except for a wireless communication frequency band used by a band-type electronic device among an NFC frequency band, a BT frequency band, an RFID frequency band, an IrDA communication frequency band, a UWB frequency band, a WLAN frequency band, a Wibro frequency band, a Wimax frequency band, or an HSDPA frequency band.

FIG. 4 illustrates an example in which the wireless charging impedance matching unit 421 performs impedance matching such that the metal housing 410 resonates at a frequency of 6.78 MHz. The scope and spirit of the inventive concept may not be limited thereto. For example, the wireless charging impedance matching unit 421 may perform impedance matching such that the metal housing 410 resonates at frequencies of various wireless charging bands.

The wireless communication impedance matching unit 422 may perform impedance matching such that the metal housing 410 resonates in a wireless communication frequency band. For one example, the wireless communication impedance matching unit 422 may perform impedance matching and may change a frequency of the metal housing 410 to one of an NFC frequency band, a BT frequency band, an RFID frequency band, an IrDA communication frequency band, a UWB frequency band, a WLAN frequency band, a Wibro frequency band, a Wimax frequency band, and an HSDPA frequency band. For another example, the wireless communication impedance matching unit 422 may perform impedance matching such that the metal housing 410 resonates in the wireless communication frequency band which is a different band distinguished from the wireless charging frequency band used by the wireless charging impedance matching unit 421.

FIG. 4 illustrates an example in which the wireless communication impedance matching unit 422 performs impedance matching such that the metal housing 410 resonates at a frequency of 13.56 MHz. The scope and spirit of the inventive concept may not be limited thereto. For example, the wireless communication impedance matching unit 422 may perform impedance matching such that the metal housing 410 resonates at frequencies of various wireless charging bands.

The first switching unit 423 may selectively drive one of the wireless charging impedance matching unit 421 and the wireless communication impedance matching unit 422.

The power feeder 424 may selectively connect with one of the wireless charging impedance matching unit 421 and the wireless communication impedance matching unit 422 according to an operation of the first switching unit 423 and may provide its output to the metal housing 410 and one of the wireless charging impedance matching unit 421 and the wireless communication impedance matching unit 422. In this case, the power feeder 424 may include a signal power feeder and a ground power feeder.

The two DC block capacitor 425 may connects the wireless charging impedance matching unit 421 and the wireless communication impedance matching unit 422 with the metal housing 410 and may remove DC components from outputs of the wireless charging impedance matching unit 421, the wireless communication impedance matching unit 422, and the metal housing 410.

The two second switching unit 426 may selectively connect the metal housing 410 with one of the two DC block capacitors 425.

Therefore, when the first switching unit 423 connects the power feeder 424 with the wireless charging impedance matching unit 421 and when the two second switching units 426 connect one connected to the wireless charging impedance matching unit 421 between the two DC block capacitor 425 with the metal housing 410, as described above, the wireless charging impedance matching unit 421 may use the metal housing 410 as a wireless charging antenna.

In contrast, when the first switching unit 423 connects the power feeder 424 with the wireless communication impedance matching unit 422 and when the two second switching units 426 connects the other connected to the wireless communication impedance matching unit 422 between the two DC block capacitor 425 with the metal housing 410, as described above, the wireless communication impedance matching unit 422 may use the metal housing 410 as a wireless communication antenna.

As such, the frequency control module 420 may selectively use the metal housing 410 as one of the wireless charging antenna and the wireless communication antenna by changing a frequency band in which the metal housing 410 resonates.

Therefore, the frequency control module 420 according to another exemplary embodiment of the inventive concept may use a wireless charging way of increasing user convenience, may minimize a size of a portion except for a band in the band-type electronic device, and may improve wireless performance by using the metal housing 410 as the wireless charging antenna or the wireless communication antenna.

Figure 5:
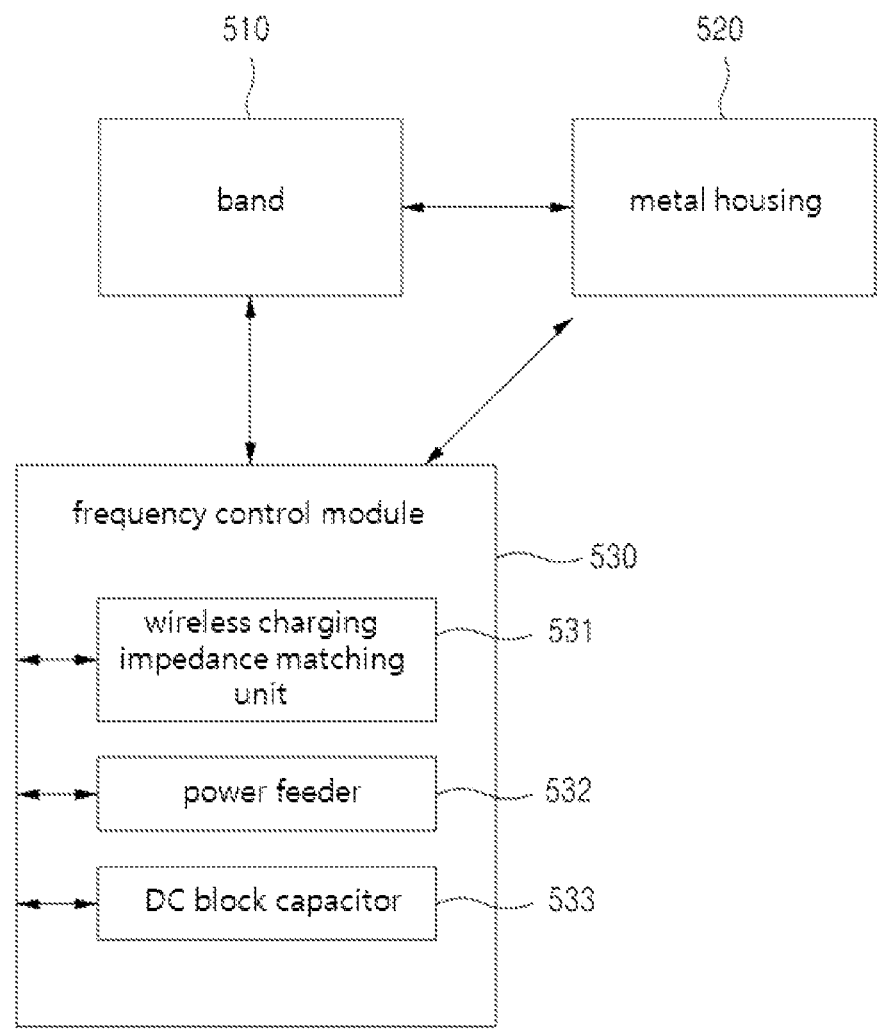
FIG. 5 is a block diagram illustrating a configuration of a band-type electronic device of using a metal housing as a wireless charging antenna according to an exemplary embodiment of the inventive concept.

FIG. 5 is a block diagram illustrating a configuration of a band-type electronic device of using a metal housing as a wireless charging antenna according to an exemplary embodiment of the inventive concept.

Referring to FIG. 5, the band-type electronic device according to an exemplary embodiment of the inventive concept may include a band 510 worn on a body of a user, a metal housing 520 connected to the band 510, and a frequency control module 530.

The band 510 is worn on the body of the user.

The metal housing 520 may connect to the band 510 and may play a role as a case in the band-type electronic device.

The frequency control module 530 may operates such that the metal housing 520 is used as a wireless charging antenna.

Specifically, the frequency control module 530 may include a wireless charging impedance matching unit 531, a power feeder 532, and a DC block capacitor 533.

The wireless charging impedance matching unit 531 may perform impedance matching such that the metal housing 520 resonates in a wireless charging frequency band. For example, the wireless charging impedance matching unit 531 may perform impedance matching and may change a frequency of the metal housing 520 to at least a part (e.g., a band which is identical to a transmit frequency band of a wireless charging transmitter which transmits a wireless charging signal) of the remaining bands except for a wireless communication frequency band. Specifically, the wireless charging impedance matching unit 531 may perform impedance matching such that the metal housing 520 resonates in the remaining bands (e.g., a band which is identical to a transmit frequency band of a wireless charging transmitter) except for a wireless communication frequency band used by the band-type electronic device among an NFC frequency band, a BT frequency band, an RFID frequency band, an IrDA communication frequency band, a UWB frequency band, a WLAN frequency band, a Wibro frequency band, a Wimax frequency band, or an HSDPA frequency band.

The power feeder 532 may connect with the wireless charging impedance matching unit 531 and may provide its output to the metal housing 520 and the wireless charging impedance matching unit 531. In this case, the power feeder 532 may include a signal power feeder and a ground power feeder.

The DC block capacitor 533 may connects with the wireless charging impedance matching unit 531 and the metal housing 520 and may remove DC components from outputs of the wireless charging impedance matching unit 531 and the metal housing 520.

As such, the wireless charging impedance matching unit 531 may operate such that the metal housing 520 is used as the wireless charging antenna. Therefore, the frequency control module 530 may supply power received from a wireless charging transmitter through the metal housing 520 to a battery module (not shown) included in the band-type electronic device to support a wireless charging function.

Figure 6:
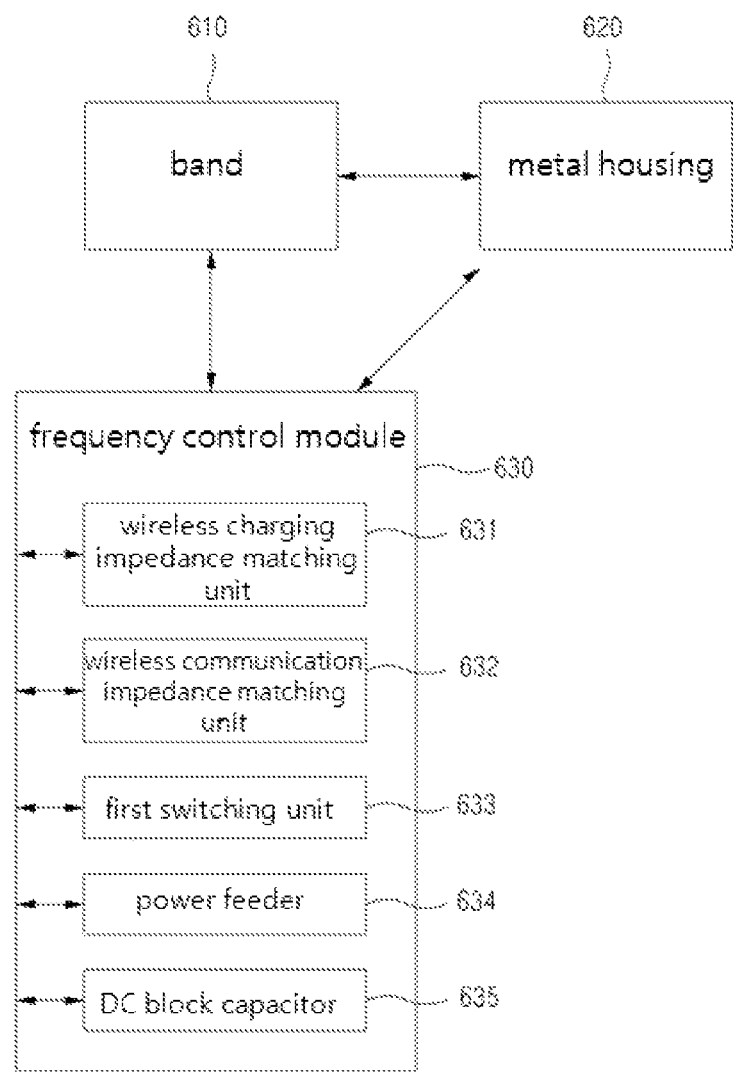
FIG. 6 is a block diagram illustrating a configuration of a band-type electronic device of using a metal housing as a wireless charging antenna or a wireless communication antenna according to an exemplary embodiment of the inventive concept.

FIG. 6 is a block diagram illustrating a configuration of a band-type electronic device of using a metal housing as a wireless charging antenna or a wireless communication antenna according to an exemplary embodiment of the inventive concept.

Referring to FIG. 6, the band-type electronic device according to an exemplary embodiment of the inventive concept may include a band 610 worn on a body of a user, a metal housing 620 connected to the band 610, and a frequency control module 630.

The band 610 is worn on the body of the user.

The metal housing 620 may connect to the band 610 and may play a role as a case in the band-type electronic device.

The frequency control module 630 may operates such that the metal housing 620 is used as a wireless charging antenna or a wireless communication antenna.

Specifically, the frequency control module 630 may include a wireless charging impedance matching unit 631, a wireless communication impedance matching unit 632, a first switching unit 633, a power feeder 634, and a DC block capacitor 635.

The wireless charging impedance matching unit 631 may perform impedance matching such that the metal housing 620 resonates in a wireless charging frequency band. For example, the wireless charging impedance matching unit 631 may perform impedance matching and may change a frequency of the metal housing 620 to at least a part (e.g., a band which is identical to a transmit frequency band of a wireless charging transmitter which transmits a wireless charging signal) of the remaining bands except for a wireless communication frequency band. Specifically, the wireless charging impedance matching unit 631 may perform impedance matching such that the metal housing 620 resonates in the remaining bands (e.g., a band which is identical to a transmit frequency band of a wireless charging transmitter) except for a wireless communication frequency band used by the band-type electronic device among an NFC frequency band, a BT frequency band, an RFID frequency band, an IrDA communication frequency band, a UWB frequency band, a WLAN frequency band, a Wibro frequency band, a Wimax frequency band, or an HSDPA frequency band.

The wireless communication impedance matching unit 632 may perform impedance matching such that the metal housing 620 resonates in a wireless communication frequency band. For one example, the wireless communication impedance matching unit 632 may perform impedance matching and may change a frequency of the metal housing 620 to one of an NFC frequency band, a BT frequency band, an RFID frequency band, an IrDA communication frequency band, a UWB frequency band, a WLAN frequency band, a Wibro frequency band, a Wimax frequency band, and an HSDPA frequency band. For another example, the wireless communication impedance matching unit 632 may perform impedance matching such that the metal housing 620 resonates in the wireless communication frequency band which is a different band distinguished from the wireless charging frequency band used by the wireless charging impedance matching unit 631.

The first switching unit 633 may selectively drive one of the wireless charging impedance matching unit 631 and the wireless communication impedance matching unit 632.

The power feeder 634 may selectively connect with one of the wireless charging impedance matching unit 631 and the wireless communication impedance matching unit 632 according to an operation of the first switching unit 633 and may provide its output to the metal housing 620 and one of the wireless charging impedance matching unit 631 and the wireless communication impedance matching unit 632. In this case, the power feeder 634 may include a signal power feeder and a ground power feeder.

The DC block capacitor 635 may connect with at least one of the wireless charging impedance matching unit 631 or the wireless communication impedance matching unit 632 and the metal housing 620 and may remove DC components from outputs of the at least one of the wireless charging impedance matching unit 631 or the wireless communication impedance matching unit 632 and the metal housing 620.

In this case, although not illustrated, when the DC block capacitor 635 includes one DC block capacitor, the frequency control module 630 may further include a second switching unit which selectively connects the DC block capacitor 630 with one of the wireless charging impedance matching unit 631 and the wireless communication impedance matching unit 632.

In this case, when the first switching unit 633 connects the power feeder 634 with the wireless charging impedance matching unit 631 and when the second switching unit connects the DC block capacitor 635 with the wireless charging impedance matching unit 631, as described above, the wireless charging impedance matching unit 631 may use the metal housing 620 as a wireless charging antenna.

In contrast, when the first switching unit 633 connects the power feeder 634 with the wireless communication impedance matching unit 632 and when the second switching unit connects the DC block capacitor 635 with the wireless communication impedance matching unit 632, as described above, the wireless communication impedance matching unit 632 may use the metal housing 620 as a wireless communication antenna.

Also, although not illustrated, the DC block capacitor 635 includes two DC block capacitors, the frequency control module 630 may further include a third switching unit which selectively connects the metal housing 620 with one of the two DC block capacitors.

In this case, when the first switching unit 633 connects the power feeder 634 with the wireless charging impedance matching unit 631 and when the third switching unit connects one connected to the wireless charging impedance matching unit 631 between the two DC block capacitors with the metal housing 620, as described above, the wireless charging impedance matching unit 631 may use the metal housing 620 as a wireless charging antenna.

In contrast, when the first switching unit 633 connects the power feeder 634 with the wireless communication impedance matching unit 632 and when the third switching unit connects the other connected to the wireless communication impedance matching unit 632 between the two DC block capacitors with the metal housing 620, as described above, the wireless communication impedance matching unit 632 may use the metal housing 620 as a wireless communication antenna.

As such, the frequency control module 630 may selectively use the metal housing 620 as one of the wireless charging antenna and the wireless communication antenna by changing a frequency band in which the metal housing 620 resonates.

Therefore, according to exemplary embodiments of the inventive concept, the band-type electronic device may use a wireless charging way of increasing user convenience, may minimize a size of its housing, and may improve wireless performance by using the metal housing as the wireless charging antenna.

According to exemplary embodiments of the inventive concept, the band-type electronic device may use a common antenna in a wireless charging process and a wireless communication process by using the metal housing as the wireless charging antenna or the wireless communication antenna.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. A band-type electronic device, comprising:
   a band configured to be worn on a body of a user;
   a metal housing configured to connect to the band; and
   a frequency control module configured to operate such that the metal housing is used as a wireless charging antenna or a wireless communication antenna,
   wherein the frequency control module comprises:
      a wireless charging impedance matching unit configured to perform impedance matching such that the metal housing resonates in a wireless charging frequency band;
      a wireless communication impedance matching unit configured to perform impedance matching such that the metal housing resonates in a wireless communication frequency band;
      a first switching unit configured to selectively drive one of the wireless charging impedance matching unit and the wireless communication impedance matching unit; and
      a power feeder configured to connect with one of the wireless charging impedance matching unit and the wireless communication impedance matching unit according to an operation of the first switching unit,
      wherein the power feeder is a separate component distinguished from a battery module that receives power received through the metal housing used as the wireless charging antenna.

2. The band-type electronic device of claim 1, wherein the metal housing is used as one of the wireless charging antenna and the wireless communication antenna as one of the wireless charging impedance matching unit and the wireless communication impedance matching unit is selectively driven according to an operation of the first switching unit.

3. The band-type electronic device of claim 1, wherein the wireless communication frequency band comprises at least one of a near field communication (NFC) frequency band, a Bluetooth (BT) frequency band, a radio frequency identification (RFID) frequency band, an infrared data association (IrDA) communication frequency band, an ultra wideband (UWB) frequency band, a wireless local area network (WLAN) frequency band, a wireless broadband (Wibro) frequency band, a world interoperability for microwave access (Wimax) frequency band, or a high speed downlink packet access (HSDPA) frequency band.

4. The band-type electronic device of claim 3, wherein the wireless charging frequency band comprises at least a part of the remaining bands except for the wireless communication frequency band.

5. The band-type electronic device of claim 1, wherein the frequency control module further comprises:
 a direct current (DC) block capacitor configured to connect with at least one of the wireless charging impedance matching unit or the wireless communication impedance matching unit and the metal housing and to remove DC components from outputs of the at least one of the wireless charging impedance matching unit or the wireless communication impedance matching unit and the metal housing.

6. The band-type electronic device of claim 5, wherein the frequency control module further comprises:
 when the DC block capacitor includes one DC block capacitor, a second switching unit configured to selectively connect the one DC block capacitor with one of the wireless charging impedance matching unit and the wireless communication impedance matching unit.

7. The band-type electronic device of claim 1, wherein the frequency control module transmits power received through the metal housing used as the wireless charging antenna to the battery module included in the band-type electronic device.

8. An antenna module included in a band-type electronic device, comprising:
 a metal housing configured to be included in the band-type electronic device; and
 a frequency control module configured to operate such that the metal housing is used as a wireless charging antenna or a wireless communication antenna,
 wherein the frequency control module comprises:
 a wireless charging impedance matching unit configured to perform impedance matching such that the metal housing resonates in a wireless charging frequency band;
 a wireless communication impedance matching unit configured to perform impedance matching such that the metal housing resonates in a wireless communication frequency band;
 a first switching unit configured to selectively drive one of the wireless charging impedance matching unit and the wireless communication impedance matching unit; and
 a power feeder configured to connect with one of the wireless charging impedance matching unit and the wireless communication impedance matching unit according to an operation of the first switching unit,
 wherein the power feeder is a separate component distinguished from a battery module that receives power received through the metal housing used as the wireless charging antenna.

* * * * *